US008004407B2

(12) United States Patent
Trosper

(10) Patent No.: US 8,004,407 B2
(45) Date of Patent: *Aug. 23, 2011

(54) RADIO FREQUENCY IDENTIFICATION DEVICES, REMOTE COMMUNICATION DEVICES, IDENTIFICATION SYSTEMS, COMMUNICATION METHODS, AND IDENTIFICATION METHODS

(75) Inventor: Scott T. Trosper, Meridian, ID (US)

(73) Assignee: Round Rock Research, LLC, Mount Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/569,791

(22) Filed: Sep. 29, 2009

(65) Prior Publication Data

US 2010/0013637 A1    Jan. 21, 2010

Related U.S. Application Data

(63) Continuation of application No. 11/847,709, filed on Aug. 30, 2007, now Pat. No. 7,602,287, which is a continuation of application No. 11/581,938, filed on Oct. 16, 2006, now Pat. No. 7,518,515, which is a continuation of application No. 10/931,802, filed on Aug. 31, 2004, now Pat. No. 7,123,148, which is a continuation of application No. 09/915,367, filed on Jul. 27, 2001, now Pat. No. 7,071,824, which is a continuation of application No. 09/364,249, filed on Jul. 29, 1999, now abandoned.

(51) Int. Cl.
*G08B 13/14* (2006.01)

(52) U.S. Cl. .................. 340/571; 340/572.1; 340/572.4; 340/10.1; 340/10.3; 340/10.4; 340/691.1; 340/8.1

(58) Field of Classification Search ............... 340/572.1, 340/10.1, 571, 539.13, 825.36, 825.49, 5.92, 340/10.3, 10.32, 10.4, 10.41, 10.42, 825.71
See application file for complete search history.

(56) References Cited

U.S. PATENT DOCUMENTS
4,075,632 A    2/1978  Baldwin et al.
(Continued)

FOREIGN PATENT DOCUMENTS
GB    2180677    4/1987
(Continued)

OTHER PUBLICATIONS

Transaction History of related U.S. Appl. No. 11/704,516, filed Feb. 7, 2007, entitled "RFIDS, interrogators, indication systems, methods of determining a bidirectional communication range of an interrogator, methods of activating an observable indicator, and methods of indicating bidirectional functionality of a radio connection."

(Continued)

*Primary Examiner* — Toan N Pham
(74) *Attorney, Agent, or Firm* — Gazdzinski & Associates, PC

(57) ABSTRACT

The present invention provides radio frequency identification devices, remote communication devices, identification systems, communication methods, and identification methods. A radio frequency identification device according to one aspect includes a substrate; communication circuitry coupled with the substrate and configured to receive a wireless signal including an identifier, to process the identifier of the wireless signal and to output a control signal responsive to the processing of the identifier; and indication circuitry coupled with the communication circuitry and configured to receive the control signal and to indicate presence of the radio frequency identification device responsive to the control signal. A communication method according to another aspect includes providing a radio frequency identification device; receiving a wireless signal including an identifier within the radio frequency identification device; processing the identifier; generating a control signal after the processing; and indicating presence of the radio frequency identification device using indication circuitry of the radio frequency identification device responsive to the control signal.

21 Claims, 5 Drawing Sheets

U.S. PATENT DOCUMENTS

| | | | |
|---|---|---|---|
| 4,223,830 A | 9/1980 | Walton | |
| 4,236,068 A | 11/1980 | Walton | |
| 4,476,469 A | 10/1984 | Lander | |
| 4,675,656 A | 6/1987 | Narcisse | |
| 4,926,182 A | 5/1990 | Ohta et al. | |
| 5,087,906 A | 2/1992 | Eaton et al. | |
| 5,113,183 A | 5/1992 | Mizuno et al. | |
| 5,119,069 A | 6/1992 | Hershkovitz et al. | |
| 5,151,684 A | 9/1992 | Johnsen | |
| 5,214,410 A | 5/1993 | Verster | |
| 5,337,041 A | 8/1994 | Friedman | |
| 5,416,486 A | 5/1995 | Koert et al. | |
| 5,450,070 A | 9/1995 | Massar et al. | |
| 5,539,393 A | 7/1996 | Barfod | |
| 5,550,547 A | 8/1996 | Chan et al. | |
| 5,565,858 A | 10/1996 | Guthrie | |
| 5,570,080 A | 10/1996 | Inoue et al. | |
| 5,572,653 A | 11/1996 | DeTemple et al. | |
| 5,581,257 A | 12/1996 | Greene et al. | |
| 5,606,323 A | 2/1997 | Heinrich et al. | |
| 5,617,060 A | 4/1997 | Wilson et al. | |
| 5,621,412 A | 4/1997 | Sharpe et al. | |
| 5,649,295 A | 7/1997 | Shober et al. | |
| 5,649,296 A | 7/1997 | MacLellan et al. | |
| 5,652,569 A | 7/1997 | Gerstenberger et al. | |
| 5,656,998 A | 8/1997 | Fujiuchi et al. | |
| 5,673,023 A | 9/1997 | Smith | |
| 5,686,902 A | 11/1997 | Reis et al. | |
| 5,689,123 A | 11/1997 | Major et al. | |
| 5,689,238 A | 11/1997 | Cannon et al. | |
| 5,689,240 A | 11/1997 | Traxler | |
| 5,742,238 A | 4/1998 | Fox | |
| 5,771,002 A | 6/1998 | Creek et al. | |
| 5,777,561 A | 7/1998 | Chieu et al. | |
| 5,787,174 A | 7/1998 | Tuttle | |
| 5,796,351 A | 8/1998 | Yabuki | |
| 5,841,770 A | 11/1998 | Snodgrass et al. | |
| 5,850,181 A | 12/1998 | Heinrisch et al. | |
| 5,850,187 A | 12/1998 | Carrender | |
| 5,861,817 A | 1/1999 | Palmer et al. | |
| 5,874,902 A | 2/1999 | Heinrich et al. | |
| 5,887,176 A | 3/1999 | Griffith et al. | |
| 5,905,429 A | 5/1999 | Hornstein et al. | |
| 5,912,632 A | 6/1999 | Dieska et al. | |
| 5,929,778 A | 7/1999 | Asama et al. | |
| 5,939,981 A | 8/1999 | Renney | |
| 5,940,006 A | 8/1999 | MacLellan et al. | |
| 5,949,328 A | 9/1999 | Latty | |
| 5,952,922 A | 9/1999 | Shober | |
| 5,963,133 A | 10/1999 | Monjo | |
| 5,963,177 A | 10/1999 | Tuttle et al. | |
| 5,966,082 A | 10/1999 | Cofino et al. | |
| 5,988,510 A | 11/1999 | Tuttle et al. | |
| 5,995,019 A | 11/1999 | Chieu et al. | |
| 6,008,727 A | 12/1999 | Want et al. | |
| 6,023,610 A | 2/2000 | Wood, Jr. | |
| 6,024,285 A | 2/2000 | Mish | |
| 6,027,027 A | 2/2000 | Smithgall | |
| 6,031,459 A | 2/2000 | Lake | |
| 6,052,062 A | 4/2000 | Tuttle | |
| 6,078,260 A | 6/2000 | Desch | |
| 6,084,512 A | 7/2000 | Elberty et al. | |
| 6,130,602 A | 10/2000 | O'Toole et al. | |
| 6,130,623 A | 10/2000 | MacLellan | |
| 6,133,830 A | 10/2000 | D'Angelo et al. | |
| 6,133,832 A | 10/2000 | Winder et al. | |
| 6,133,836 A | 10/2000 | Smith | |
| 6,137,422 A | 10/2000 | Hahn et al. | |
| 6,147,602 A | 11/2000 | Bender | |
| 6,150,921 A | 11/2000 | Werb et al. | |
| 6,184,789 B1 | 2/2001 | Richley et al. | |
| 6,198,392 B1 | 3/2001 | Hahn et al. | |
| 6,255,951 B1 | 7/2001 | De La Huerga | |
| 6,275,142 B1 | 8/2001 | Paleiov et al. | |
| 6,289,209 B1 | 9/2001 | Wood, Jr. | |
| 6,297,737 B1 | 10/2001 | Irvin | |
| 6,304,183 B1 | 10/2001 | Causey | |
| 6,326,889 B1 | 12/2001 | Van Horn et al. | |
| 6,327,017 B2 | 12/2001 | Barberi et al. | |
| 6,333,690 B1 | 12/2001 | Nelson et al. | |
| 6,354,493 B1 | 3/2002 | Mon | |
| 6,452,496 B1 | 9/2002 | Van Horn et al. | |
| 6,452,573 B1 | 9/2002 | Martinot-Lagarde et al. | |
| 6,459,376 B2 | 10/2002 | Trosper | |
| 6,466,130 B2 | 10/2002 | Van Horn et al. | |
| 6,480,699 B1 | 11/2002 | Lovoi | |
| 6,486,794 B1 | 11/2002 | Calistro et al. | |
| 6,545,605 B2 | 4/2003 | Van Horn et al. | |
| 6,566,997 B1 | 5/2003 | Bradin | |
| 6,621,417 B2 | 9/2003 | Duncan et al. | |
| 6,795,146 B2 | 9/2004 | Dozov et al. | |
| 6,831,716 B2 | 12/2004 | Dozov et al. | |
| 6,956,538 B2 | 10/2005 | Moore | |
| 6,973,710 B2 | 12/2005 | Kiguchi et al. | |
| 6,975,221 B2 | 12/2005 | Monck | |
| 7,022,809 B2 | 4/2006 | Lamarque et al. | |
| 7,042,358 B2 | 5/2006 | Moore | |
| 7,071,824 B2 | 7/2006 | Trosper | |
| 7,086,588 B2 | 8/2006 | Hoshina | |
| 7,123,148 B2 | 10/2006 | Trosper | |
| 7,145,459 B2 | 12/2006 | Wu et al. | |
| 7,283,036 B2 | 10/2007 | Chen | |
| 7,327,261 B2 | 2/2008 | Weslake et al. | |
| 7,511,601 B2 | 3/2009 | Eisenberg et al. | |
| 7,602,287 B2 * | 10/2009 | Trosper | 340/571 |
| 2007/0290850 A1 | 12/2007 | Trosper | |
| 2007/0290851 A1 | 12/2007 | Trosper | |
| 2007/0290852 A1 | 12/2007 | Trosper | |
| 2008/0111675 A1 | 5/2008 | Tuttle | |
| 2008/0186178 A1 | 8/2008 | Tuttle | |

FOREIGN PATENT DOCUMENTS

| | | |
|---|---|---|
| KR | 20060088481 | 8/2006 |
| WO | 2005024595 | 3/2005 |
| WO | 2006035401 | 4/2006 |

OTHER PUBLICATIONS

Transaction History of related U.S. Appl. No. 09/364,249, filed Jul. 29, 1999, entitled "Radio Frequency Identification Devices, Remote Communication Devices, Identification Systems, Communication Methods, and Identification Methods," now abandoned.

Transaction History of related U.S. Appl. No. 09/915,367, filed Jul. 27, 2001, entitled "Radio Frequency Identification Devices, Remote Communication Devices, Identification Systems, Communication Methods, and Identification Methods," now U.S. Patent No. 7,071,824.

Transaction History of related U.S. Appl. No. 10/931,802, filed Aug. 31, 2004, entitled "Radio Frequency Identification Devices, Remote Communication Devices, Identification Systems, Communication Methods, and Identification Methods," now U.S. Patent No. 7,123,148.

Transaction History of related U.S. Appl. No. 11/581,938, filed Oct. 16, 2006, entitled "Method and System for RFID Communication."

Transaction History of related U.S. Appl. No. 11/595,683, filed Nov. 10, 2006, entitled "Tracking systems, passive RFIDs, methods of locating and identifying RFIDs, and methods of tracking items."

Transaction History of related U.S. Appl. No. 11/847,694, filed Aug. 30, 2007, entitled "Radio Frequency Identification Devices, Remote Communication Devices, Identification Systems, Communication Methods, and Identification Methods."

Transaction History of related U.S. Appl. No. 11/847,701, filed Aug. 30, 2007, entitled "Radio Frequency Identification Devices, Remote Communication Devices, Identification Systems, Communication Methods, and Identification Methods."

U.S. Appl. No. 08/907,689, Wood, Jr, Original Application; filed Aug. 8, 1997; Amendment filed Aug. 4, 1998; Amendment filed Sep. 10, 1999; Pending Claims.

U.S. Appl. No. 09/363,945, Scott T. Trosper, Original Application; filed Jul. 29, 1999 ;Pending Claims.

U.S. Appi. No. 09/363,944, Scott T. Trosper, Original Application; filed Jul. 29, 1999 ;Pending Claims.

RFID; http://www.aimglobal.org/technologies/rfid/; Mar. 9, 2001; pp. 1-2.

International Application No. PCT/US07/23505, International Search Report, May 30, 2008.

International Application No. PCT/UC07/23505, Written Opinion, May 30, 2008.

International Application No. PCT/US08/51272, International Search Report, Jun. 27, 2008.

International Application No. PCT/US08/51272, Written Opinion, Jun. 27, 2008.

"Epson's Electronic Ink+RFID=21st Century Price Tags," located at http://www.gizmodo.com/gadgets/epsons-electronic-ink-rfid, accessed May 9, 2006.

"RFID, OLED, Organic Semiconductors and Electronic Ink," located at http://www.organicmatter.net/node/77, 2005.

Perez, G.B. et al., "An Ultra-Low Power, Optically-Interrogated Smart Tagging and Identification System," Fourth IEEE Workshop on Automatic Identification Advanced Technologies (AutoID'05), pp. 187-192, Oct. 2005.

USPTO Transaction History of U.S. Appl. No. 09/364,249, filed Jul. 29, 1999, entitled "Radio Frequency Identification Devices, Remote Communication Devices, Identification Systems, Communication Methods, and Identification Methods," now abandoned.

USPTO Transaction History of U.S. Appl. No. 11/847,694, filed Aug. 30, 2007, entitled "Radio Frequency Identification Devices, Remote Communication Devices, Identification Systems, Communication Methods, and Identification Methods."

USPTO Transaction History of U.S. Appl. No. 11/847,701, filed Aug. 30, 2007, entitled "Radio Frequency Identification Devices, Remote Communication Devices, Identification Systems, Communication Methods, and Identification Methods."

USPTO Transaction History of U.S. Appl. No. 11/847,709, filed Aug. 30, 2007, entitled "Radio Frequency Identification Devices, Remote Communication Devices, Identification Systems, Communication Methods, and Identification Methods."

\* cited by examiner

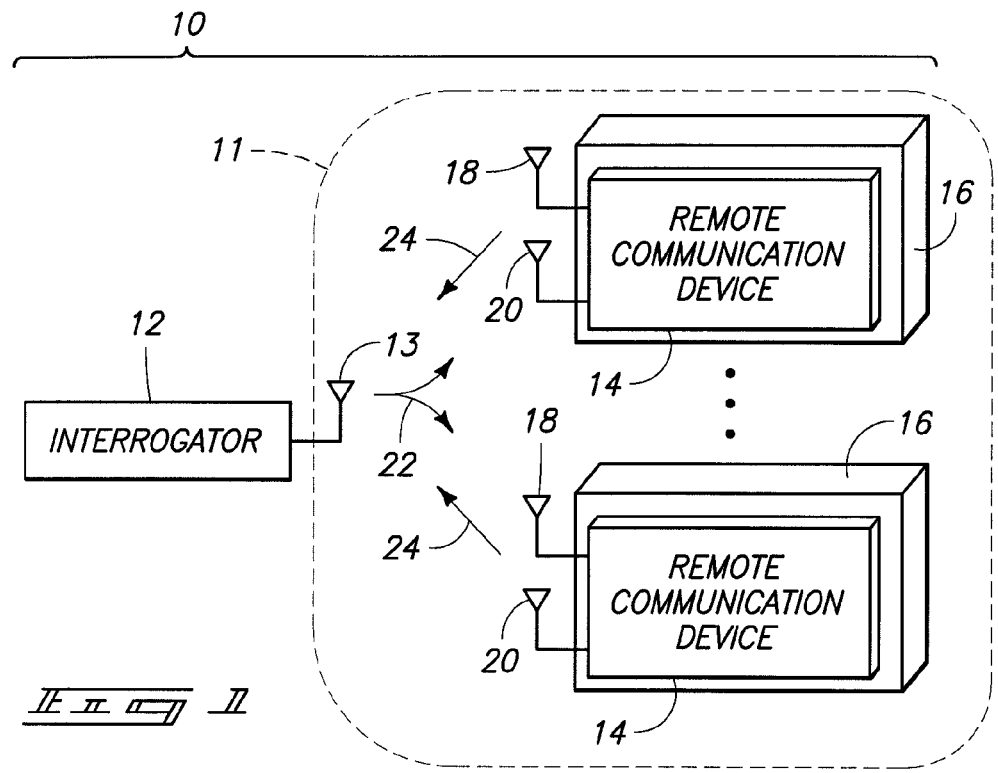
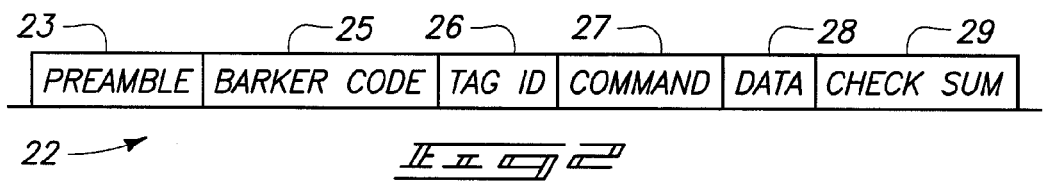
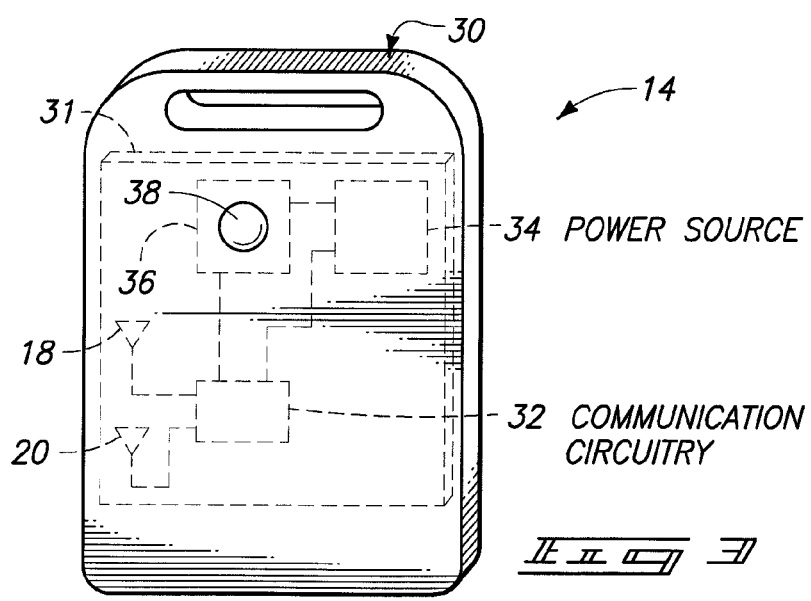

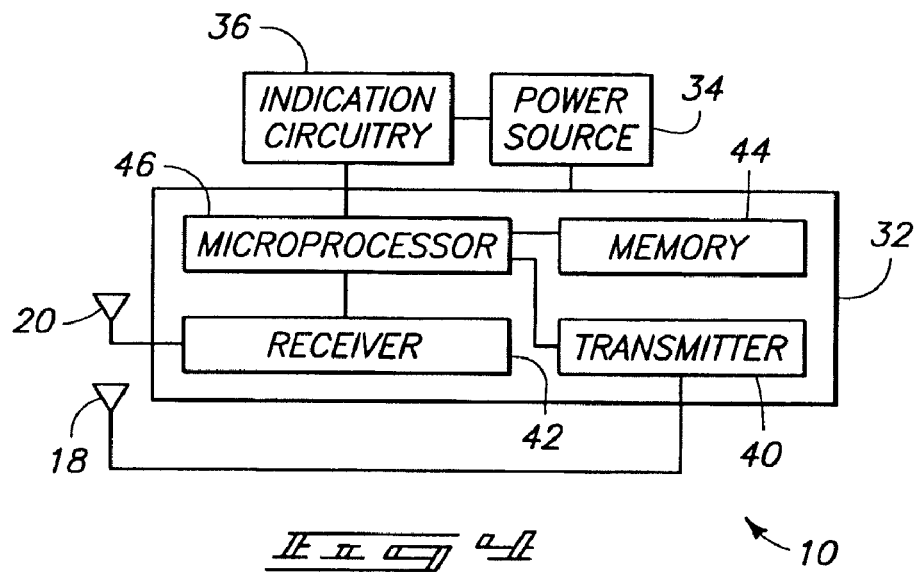
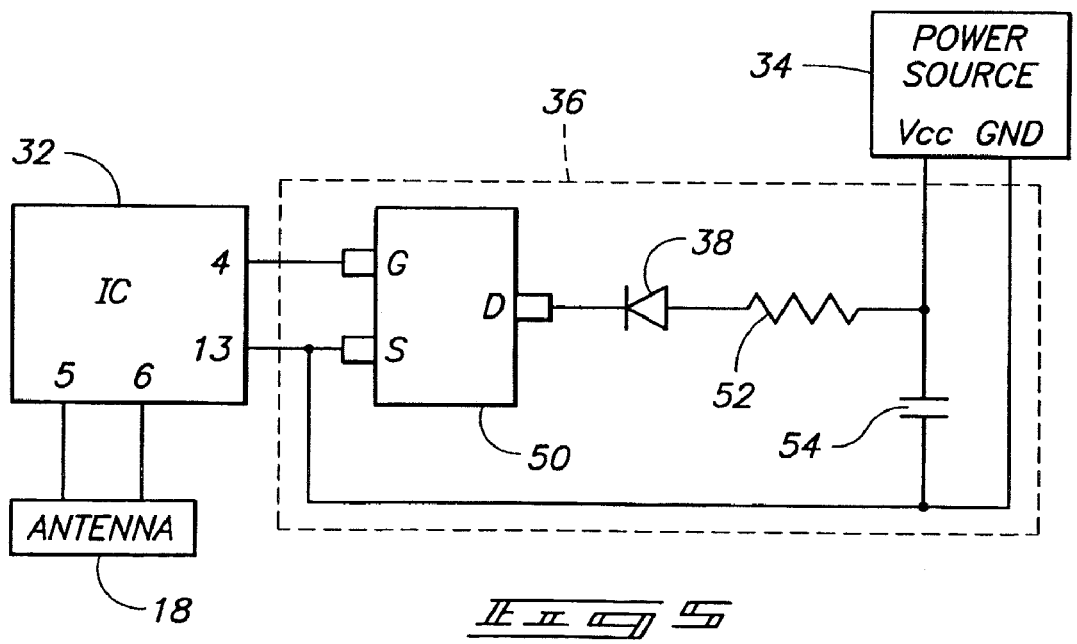

RADIO FREQUENCY IDENTIFICATION DEVICES, REMOTE COMMUNICATION DEVICES, IDENTIFICATION SYSTEMS, COMMUNICATION METHODS, AND IDENTIFICATION METHODS

CROSS-REFERENCE TO RELATED APPLICATIONS

The present application is a continuation application of application Ser. No. 11/847,709, filed Aug. 30, 2007, now U.S. Pat. No. 7,602,287, which is a continuation application of application Ser. No. 11/581,938, filed Oct. 16, 2006, now U.S. Pat. No. 7,518,515, which is a continuation application of application Ser. No. 10/931,802 filed Aug. 31, 2004, now U.S. Pat. No. 7,123,148, which is a continuation application of application Ser. No. 09/915,367, filed Jul. 27, 2001, now U.S. Pat. No. 7,071,824, which is a continuation application of application Ser. No. 09/364,249, now abandoned. The disclosures of the above-referenced applications are incorporated herein by reference in their entirety.

TECHNICAL FIELD

This invention relates to radio frequency identification devices, remote communication devices, identification systems, communication methods, and identification methods.

BACKGROUND OF THE INVENTION

Wireless communication systems including electronic identification devices, such as radio frequency identification devices (RFIDs), are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way of tracking objects is with an electronic identification system.

One presently available electronic identification system utilizes a magnetic coupling system. Typically, the devices are entirely passive (have no power supply), which results in a small and portable package. However, such identification systems are only capable of operation over a relatively short range, limited by the size of a magnetic field used to supply power to the devices and to communicate with the devices.

Another type of wireless communication system is an active wireless electronic identification system. Attention is directed towards commonly assigned U.S. patent application Ser. No. 08/705,043, filed Aug. 29, 1996, now U.S. Pat. No. 6,130,602, incorporated herein by reference, and which describes such active systems in detail.

These systems include integrated circuit devices which include an active transponder and are intended to be affixed to an object to be monitored. The devices are capable of receiving and processing instructions transmitted by an interrogator. A device receives the instruction, if within range, then processes the instruction and transmits a response, if appropriate. The interrogation signal and the responsive signal are typically radio-frequency (RF) signals produced by an RF transmitter circuit. Because active devices have their own power sources, such do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

It may be desired to identify one or more particular remote communication devices within the plurality of remote communication devices of the wireless communication system. For example, it may be desired to identify the location of a particular package in the field. An exemplary use is to assist with the quick identification of a desired package within numerous objects in inventory. Thus, there exists a need to provide an improved identification system and identification method of the remote communication devices.

SUMMARY OF THE INVENTION

The present invention provides radio frequency identification devices, remote communication devices, identification systems, communication methods, and identification methods.

A remote communication device including a radio frequency identification device according to one aspect of the invention includes substrate and communication circuitry coupled with the substrate. The communication circuitry is configured to receive a wireless signal including an identifier, to process the identifier of the wireless signal and to output a control signal responsive to the processing of the identifier. Indication circuitry is coupled with the communication circuitry and configured to receive the control signal and to indicate presence of the remote communication device responsive to the control signal.

The indication circuitry emits a human perceptible signal, such as a visible signal, in but one configuration to indicate presence of the desired remote communication device. Devices of the present invention can be utilized in exemplary applications to assist with the identification of one or more desired remote communication devices. Also, such can be utilized to identify one or more desired objects associated with the identified remote communication devices in one exemplary application. Other aspects are provided in the present invention.

BRIEF DESCRIPTION OF THE DRAWINGS

Preferred embodiments of the invention are described below with reference to the following accompanying drawings.

FIG. 1 is an illustrative diagram of an exemplary wireless communication system.

FIG. 2 is a diagrammatic representation of an exemplary forward link wireless signal outputted from an interrogator of the wireless communication system shown in FIG. 1.

FIG. 3 is an isometric view of an exemplary remote communication device of the wireless communication system shown in FIG. 1.

FIG. 4 is a functional block diagram of internal circuitry according to one configuration of the remote communication device.

FIG. 5 is an illustrative representation of exemplary indication circuitry of the remote communication device of FIG. 4.

DETAILED DESCRIPTION OF THE PREFERRED EMBODIMENTS

Figure 6:
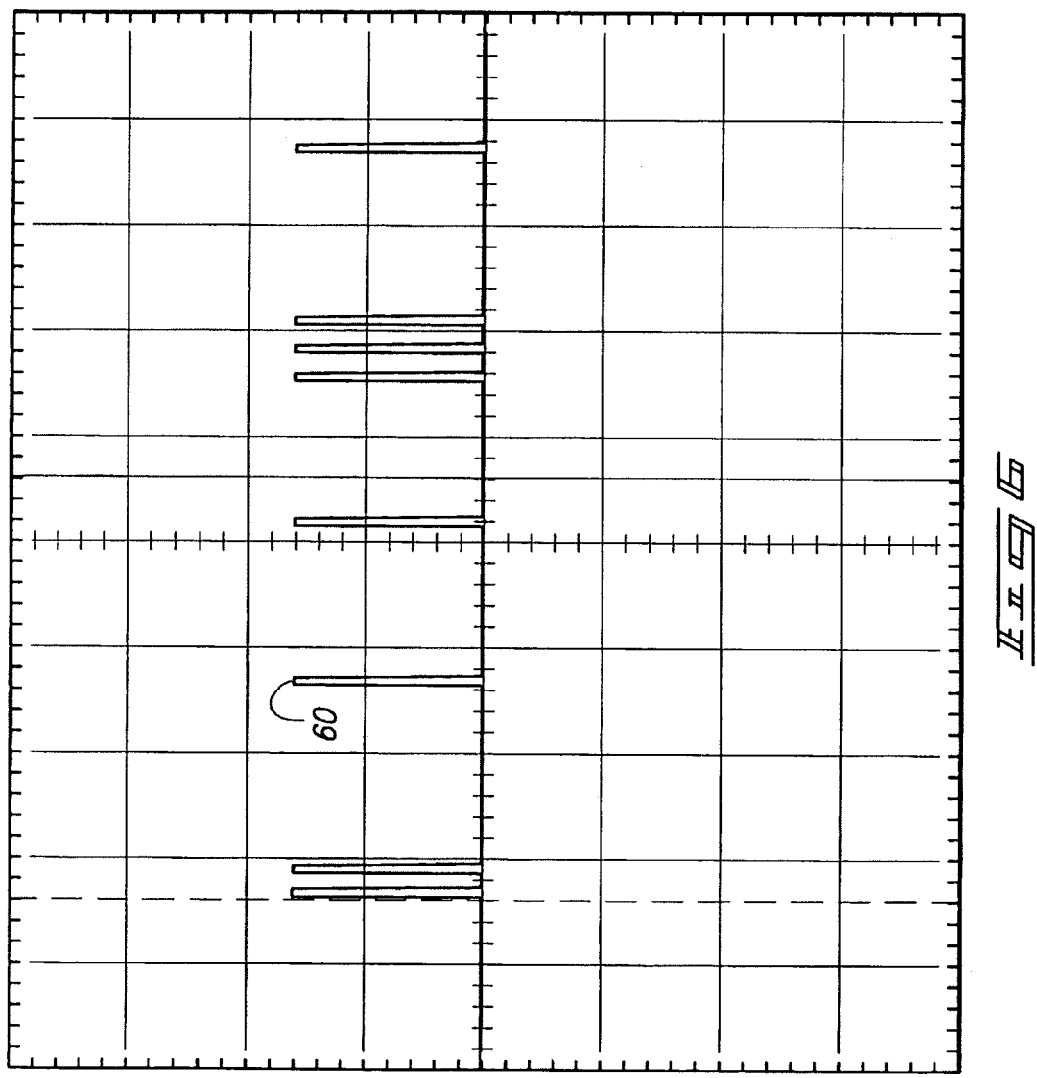
FIG. 6 is a graphical illustration representing exemplary remote communication device operations.

This disclosure of the invention is submitted in furtherance of the constitutional purposes of the U.S. Patent Laws "to promote the progress of science and useful arts" (Article 1, Section 8).

Referring to FIG. 1, a wireless communication system 10 is illustrated in accordance with one embodiment of the invention. Wireless communication system 10 includes an interrogator 12 and at least one remote communication device 14. Typically, numerous remote communication devices 14 are provided within wireless communication system 10 although only two such remote communication devices 14 are illustrated in FIG. 1. The particular number of remote communication devices 14 which are in communication with interrogator 12 may change over time. During exemplary object monitoring operations, more or less remote communication devices 14 can be within a communication range of wireless communication system 10 as objects or packages are moved about.

A communication range 11 of interrogator 12 is shown in FIG. 1. Interrogator 12 communicates with remote communication devices 14 located within communication range 11. Typically, there is no communication between multiple remote communication devices 14. Instead, remote communication devices 14 respectively communicate with interrogator 12. As previously mentioned, multiple remote communication devices 14 are typically used in the same field of interrogator 12 (i.e., within communications range 11 of interrogator 12).

It may be beneficial to determine communication range 11 of interrogator 12 in a given application. As described below, one aspect of the disclosure provides a remote communication device 14 having indication circuitry (one configuration is shown in FIG. 3) configured to assist with the determination of communication range 11 during testing operations. Such a remote configuration device 14 can comprise a device utilized for normal communication or testing operations, or alternatively, for testing operations only.

During testing operations, remote communication device 14 having the indication circuitry of FIG. 3 can be moved throughout an area larger than and including communication range 11 to assist with the determination of communication range 11. Interrogator 12 can be utilized to output plural forward link wireless signals 22 during testing operations. Remote communication device 14 operates to output a human perceptible signal (e.g., human visible light) as described below when it is present within communication range 11 and receiving forward link wireless signals 22. Such human perceptible signals can be used to assist with determining communication range 11 of interrogator 12 by noting where such human perceptible signals are generated as remote communication device 14 is moved.

In addition, remote communication device 14 can be utilized to verify correct installation and operation of 10 wireless communication system. Remote communication device 14 indicates proper operation and installation of interrogator 12 responsive to receiving forward link wireless signals 22.

In the described embodiment, wireless communication system 10 is configured as an electronic identification system. Other configurations of wireless communication system 10 are possible. Remote communication devices 14 can individually be associated with respective objects 16, such as packages in inventory. Wireless communication system 10 can also be used in other applications including other identification applications.

Remote communication devices 14 individually comprise a wireless identification device in the described arrangement. Other configurations of remote communication devices 14 are possible. An exemplary wireless identification device is a radio frequency identification device (RFID). In the depicted configuration, remote communication devices 14 individually include an antenna 18 for wireless or radio frequency transmission by the respective remote communication device 14. Remote communication devices 14 further individually include an antenna 20 for wireless or radio frequency reception by the respective remote communication device 14. In one embodiment, the antennas 18, 20 are microstrip antennas.

Individual remote communication devices 14 transmit and receive radio frequency communications to and from interrogator 12. An exemplary interrogator is described in commonly assigned U.S. patent application Ser. No. 08/907,689, filed Aug. 8, 1997, now U.S. Pat. No. 6,289,209, and incorporated herein by reference. Preferably, interrogator 12 includes an antenna 13 as well as dedicated transmitting and receiving circuitry. In one embodiment, such circuitry is complementary to that implemented within individual remote communication devices 14.

Radio frequency identification has emerged as a viable system for tagging or labeling small to large quantities of objects 16. In the described configuration, interrogator 12 and remote communication devices 14 communicate via an electromagnetic link, such as via an RF link (e.g., at microwave frequencies, in one embodiment), so all transmissions by interrogator 12 are heard simultaneously by all remote communication devices 14 within communication range 11.

Interrogator 12 transmits forward link wireless signals 22 individually comprising an interrogation signal or command via antenna 13. Referring to FIG. 2, an exemplary forward link wireless signal 22 is shown. The depicted forward link wireless signal 22 includes a preamble 23, barker code 25, tag identifier (ID) 26, command 27, data 28 and check sum 29.

Tag identifier 26 can comprise an identifier to identify one or more of remote communication devices 14 in some applications. For example, tag identifier 26 can identify one, more than one, or all of remote communication devices 14. As described below, typically only the remote communication devices 14 identified within tag identifier 26 process the respective command 27 and data 28.

Referring again to FIG. 1, remote communication devices 14 within the appropriate communication range 11 individually receive the incoming interrogation forward link wireless signal 22 via respective antennas 20. Upon receiving wireless signal 22, individual ones of remote communication devices 14 can respond by generating and transmitting a responsive signal or return link communication signal 24 via respective antenna 18. The responsive signal 24 typically includes information that a uniquely identifies, or labels the particular remote communication device 14 that is transmitting. Such may operate to identify a respective object 16 with which the responding remote communication device 14 is associated. Exemplary objects 16 include packages in inventory, people, automobiles, animals, etc.

Referring to FIG. 3, remote communication device 14 can be included in any appropriate packaging or housing 30. Various methods of manufacturing housings are described in commonly assigned U.S. patent application Ser. No. 08/800,037, filed Feb. 13, 1997, now U.S. Pat. No. 5,988,510, and incorporated herein by reference. An exemplary housing 30 includes an ultrasonically welded plastic injection molded case. Housing 30 is provided about a substrate 31 and at least some of the circuitry of remote communication device 14.

Housing 30 can be configured as a case about substrate 31 to enclose most if not all of the internal components of remote communication device 14. More specifically, circuitry of remote communication device 14 is provided upon substrate 31 in one embodiment. An exemplary substrate 31 is FR4 board. Circuit components of remote communication device 14 may be attached to substrate 31 using pick-and-place processing techniques.

FIG. 3 shows but one embodiment of remote communication device 14 in the form of a card or badge including housing 30 of plastic or other suitable material. In one embodiment, a face of housing 30 has visual identification features such as graphics, text, information found on identification or credit cards, etc. (not shown). Housing 30 can also be formed as a miniature housing encasing the internal circuitry and power supply 16 to define a tag which can be supported by object 16 (e.g., hung from an object, affixed to an object, etc.). Other forms of housings 30 are employed in alternative embodiments.

In the illustrated embodiment, remote communication device 14 includes communication circuitry 32, a power source 34 and indication circuitry 36. Communication circuitry 32 is defined by a small outline integrated circuit (SOIC) as described in the above-incorporated patent application Ser. No. 08/705,043, filed Aug. 29, 1996, now U.S. Pat. No. 6,130,602. Exemplary communication circuitry 32 is available from Micron Communications Inc., 3176 S. Denver Way, Boise, Id. 83705 under the trademark Microstamp Engine™ and having designations MSEM256X10SG, MT59RC256R1FG-5. Other embodiments of communication circuitry 32 are possible. Power source 34 is connected to supply power to communication circuitry 32 and indication circuitry 36.

In one embodiment, power source 34 comprises one or more batteries. Individual batteries can take any suitable form. Preferably, the battery type will be selected depending on weight, size, and life requirements for a particular application. In one embodiment, a suitable battery is a thin profile button-type cell forming a small and thin energy cell more commonly utilized in watches and small electronic devices requiring a thin profile. A conventional button-type cell has a pair of electrodes, an anode formed by one face and a cathode formed by an opposite face. In an alternative embodiment, power source 34 comprises a series connected pair of button type cells. In alternatives embodiments, other types of suitable power source are employed. Suitable batteries of power source 34 individually include a 3 Volt battery having designation CR2016 available from Eveready Battery Co. Two such batteries can be coupled in series for a 6 Volt output of power source 34 in one embodiment.

In the described arrangement, communication circuitry 32 is coupled with substrate 31 and is configured to at least one of receive wireless signals and communicate wireless signals. Exemplary received and communicated wireless signals comprise radio frequency signals as previously described. In one embodiment, communication circuitry 32 comprises transponder circuitry configured to output the reply or return link wireless identification signal responsive to the reception of a forward link wireless interrogation signal generated within interrogator 12.

Indication circuitry 36 is coupled with substrate 31 and communication circuitry 32. In the described embodiment, indication circuitry 36 includes an indicator 38 to indicate operation of remote communication device 14. Remote communication device 14 can be configured such that indication circuitry 36 indicates at least one of reception of wireless signals and generation of wireless signals. Indication circuitry 36 may also be configured to indicate the outputting of wireless signals from remote communication device 14.

Remote communication device 12 having indication circuitry 36 can also be configured to provide additional indication operations in addition to those described herein. Exemplary additional indication operations of remote communication device 12 are described in commonly assigned U.S. patent application Ser. No. 09/363,944 entitled "Radio Frequency Identification Devices, Wireless Communication Systems, Communication Methods, Methods of Forming a Radio Frequency Identification Device, Methods of Testing Wireless Communication Operations, and Methods of Determining, a Communication Range," naming Mark T. Van Horn, David K. Ovard and Scott T. Trosper as inventors, filed Jul. 29, 1999, now U.S. Pat. No. 6,466,130, and incorporated herein by reference, and in commonly assigned U.S. patent application Ser. No. 09/363,945 entitled "Radio Frequency Identification Devices, Remote Communication Devices, Wireless Communication Systems, and Methods of Indicating Operation," naming Scott T. Trosper as inventor, filed Jul. 29, 1999, now U.S. Pat. No. 6,459,376, and incorporated herein by reference.

Indication circuitry 36 includes indicator 38 configured to emit a human perceptible signal to indicate operation of the remote communication device 14 in accordance with a preferred configuration. In the described embodiment, indicator 38 is configured to visually indicate operation of remote communication device 14. In particular, indicator 38 can include at least one light emitting device, such as a light emitting diode (LED), to emit a signal visually perceptible to humans. An exemplary LED has designation L20265-ND and is available from Digi-Key Corp. Indication circuitry 36 can also include other indicators 38 for indicating operation of remote communication device 14. Another exemplary indicator 38 includes an audible device, such as a buzzer. Indicator 38 can have other configurations.

Preferably, remote communication device 14 is configured such that indicator 38 of indication circuitry 36 outwardly emits the human perceptible signal or otherwise indicates operation outside of housing 30. For example, indicator 38 may extend through housing 30 as shown and is externally visible. In the depicted arrangement, housing 30 is provided about substrate 31 and internal circuitry with indication circuitry 36 at least partially outwardly exposed as illustrated.

Referring to FIG. 4, communication circuitry 32 of remote communication device 14 implemented as a single die in accordance with the described embodiment includes a transmitter 40, a receiver 42, a memory 44, and a microprocessor 46. Microprocessor 46 is coupled to transmitter 40, receiver 42, and memory 44 as described in the above-incorporated U.S. patent application Ser. No. 08/705,043, filed Aug. 29, 1996, now U.S. Pat. No. 6,130,602. In one configuration, transmitter 40 is configured to reply using backscatter communications.

Forward link wireless signals 22 are received within antenna 20 and applied to receiver 42. The forward link wireless signals 22 can be specific to individual remote communication devices 14, or intended to apply to some or all remote communication devices 14 within communication range 11.

Microprocessor 46 is configured to process the signals received by receiver 42. Responsive to the content of a received forward link wireless signal 22, microprocessor 46 can formulate return link wireless signal 24 which is applied to transmitter 40. Transmitter 40 operates to output return link wireless signals 24 using antenna 18. As is previously described, transmitter 40 may be configured for backscatter communications. For example, antenna 18 can be configure dipole antenna and transmitter 40 can selectively short halves of the dipole antenna configuration to selectively reflect a continuous wave signal generated by interrogator 12.

Referring to FIG. 5, operations of communication circuitry 32 and indication circuitry 36 are described. As previously mentioned, communication circuitry 32 can be implemented in a SOIC configuration. The SOIC includes plural pin connections, some of which are illustrated in FIG. 5. For example, a pin 4 is coupled with an internal current source (not shown) which is configured to output a current signal corresponding to backscatter communications. The current signal outputted from pin 4 corresponds to the control signal utilized to control modulation of the continuous wave signal during backscatter communications.

Plural pins 5, 6 of communication circuitry 32 can be coupled with antenna 18. In one embodiment, pins 5, 6 can be coupled with respective halves of the dipole antenna configuration to implement backscatter communications. Internal of communication circuitry 32, a switch (not shown) selectively shorts pins 5, 6 to implement the appropriate backscatter modulation communications. A pin 13 of communication circuitry 32 is a ground voltage reference pin.

In the depicted arrangement, pins 4, 13 are coupled with indication circuitry 36. The depicted indication circuitry 36 includes indicator 38, transistor 50, resistor 52 and capacitor 54 arranged as illustrated. In an exemplary configuration, capacitor 54 is a 0.1 µF 5 mT capacitor having designation ZVN3306FCT-ND available from Digi-Key Corp. and resistor 52 is a 620 Ohm ⅛th Watt 5 mT resistor having designation P620ETR-ND available from Digi-Key Corp. Transistor 50 is a ZVN3306FCT-ND N-Channel MOSFET transistor available from Digi-Key Corp.

During operations, remote communication device 14 including indication circuitry 36 can be moved within an area including communication range 11. Interrogator 12 can be provided in a mode to continually transmit an identify command which prompts a return message from all remote communication devices 14 within communication range 11. In such a test mode, remote communication device 14 having indication circuitry 36 configured as shown can assist with the determination of communication range 11.

For example, following the receipt and processing by microprocessor 46 of forward link wireless signal 22 having an appropriate tag identifier 26 and identify command 27, remote communication device 14 formulates a return link wireless signal. Microprocessor 46 formulates the return link wireless signal and transmitter 40 is configured to output the return link wireless signal. Such return link wireless signals can be applied via pin 4 to indication circuitry 36. During testing operations to determine communication range 11, wireless communications via antenna 18 can remain enabled or, alternatively, be disabled if return link communication signals are undesired.

Transmitter 40 outputs a current signal via pin 4 to indication circuitry 36 during a return link communication. Pin 4 can be coupled with the gate (G) of transistor 50. Responsive to the gate receiving current from pin 4, the drain (D) connection is coupled with the source (S) connection of transistor 50. Such closes the circuitry within indication circuitry 36 and illuminates indicator 38 comprising a light emitting device. A typical backscatter reply signal is 20 ms in the described embodiment. Such results in a visible flashing of indicator 38 in the described embodiment corresponding to received forward link wireless signals 22.

Accordingly, the indication of operations of remote communication device 14 using indicator 38 is responsive to processing of the forward link wireless signal and generation of the return link wireless signal. Other configurations for controlling indicator 38 are possible. Further, the duration of the return link wireless signal can be adjusted in other configurations to vary the length of the indicating signal using indication circuitry 36.

Referring to FIG. 6, a graph illustrates an exemplary testing operation using a remote communication device 14 having indication circuitry 36 to determine communication range 11 of interrogator 12 in one application. Time progresses from left to right in the graph of FIG. 6. A voltage across resistor 52 of indication circuitry 36 is represented in the vertical direction.

Remote communication device 14 can be moved throughout an area adjacent wireless communication system 10. During such movements, remote communication device 14 may be moved in and out of communication range 11. Such results in the reception of only, some of the forward link wireless signals 22 being continually generated using interrogator 12 during testing operations. Accordingly, the generation of return link wireless signals 24 corresponds to received forward link wireless signals 22 while remote communication device 14 is moved within communication range 11.

The generation of a return link wireless signal 24 results in a spike 60. The divisions of the illustrated graph are approximately 250 ms and individual spikes 60 are approximately 20 ms in length corresponding to the duration of return link wireless signals 24. The generation of the return link wireless signals 24 depends upon the movement of the remote communication device 14 with respect to communication range 11. Spikes 60 correspond to remote communication device 14 being within communication range 11. As illustrated, indicator 38 only generates some emissions responsive to continuous generation of forward link wireless signals 22 from interrogator 12 and responsive to remote communication device 14 being moved in and out of communication range 11. Inasmuch as spikes 60 correspond to the emission of light from indicator 38, such can be utilized by an individual to visually determine the boundaries of communication range 11 of interrogator 12 in a given application. The number of spikes 60 (i.e., outputted as flashes of light from indicator 38 in the described configuration) increases with increasing field strength.

Figure 7:
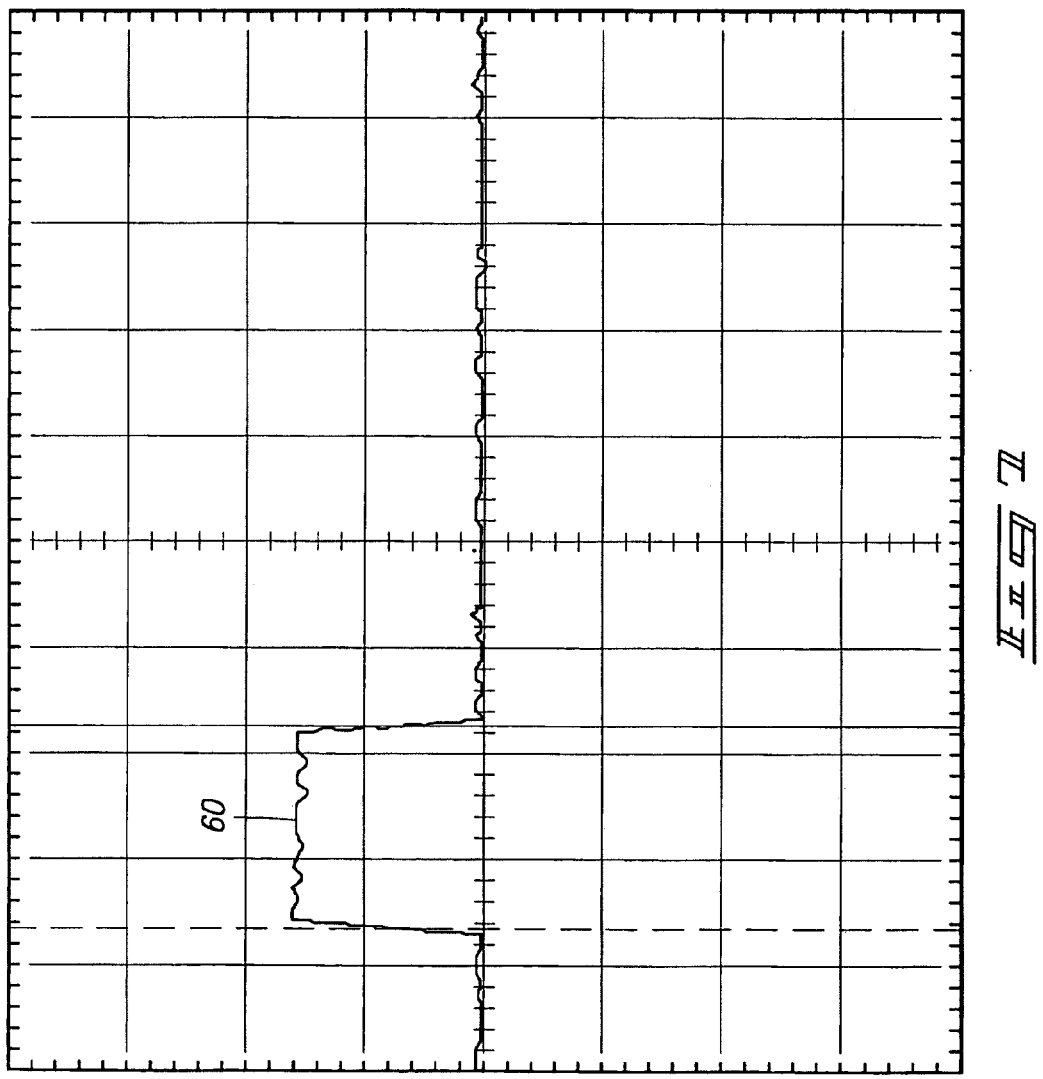
FIG. 7 is a graphical illustration showing further details of the illustration of FIG. 6.

Referring to FIG. 7, one spike 60 is illustrated in detail. Again, time increases in the illustrated graph of FIG. 7 from left to right. The voltage across resistor 52 of indication circuitry 36 is indicated in the vertical direction. Some modulation upon the top portion of spike 60 results due to backscatter modulation of the signal outputted from pin 4 of communication circuitry 32. However, the capacitive effect of the gate pin of transistor 50 minimizes such modulation effects upon the operation of indication circuitry 36.

Figure 8:
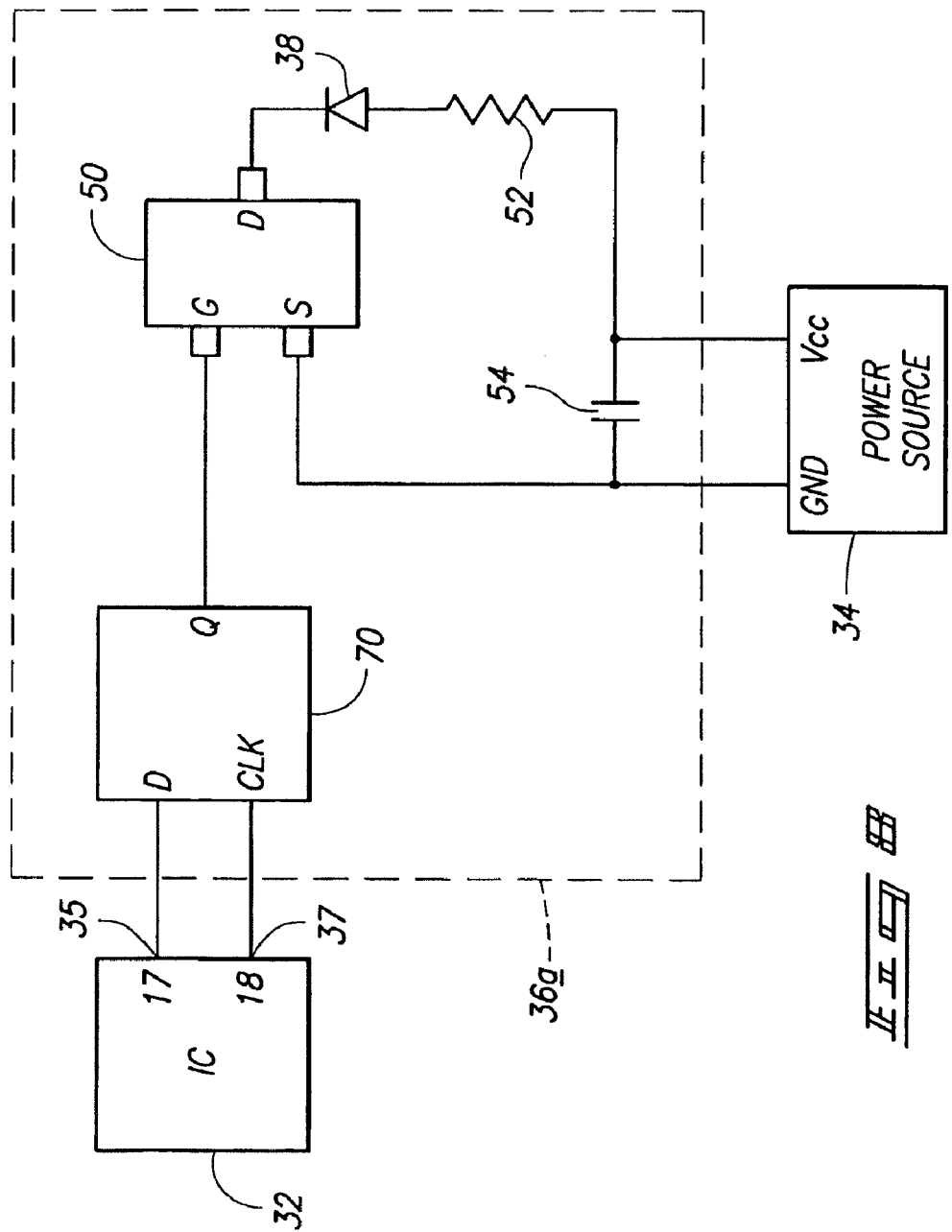
FIG. 8 is an illustrative representation of another configuration of indication circuitry of the remote communication device.

Referring to FIG. 8, an alternative configuration of indication circuitry 36a of remote communication device 14 is illustrated. The depicted indication circuitry 36a is coupled with communication circuitry 32 and power source 34. Indication circuitry 36a can be utilized alone or in combination with indication circuitry 36 described with reference to FIG. 5 above.

Indication circuitry 36a is coupled with a data port 35 and a clock output 37 of communication circuitry. Port 35 and clock output 37 can respectively comprise pins 17, 18 of the integrated circuitry comprising communication circuitry 32. Port 35 can comprise a digital port and clock output 37 can comprise a digital clock output. The depicted indication circuitry 36a includes a latch 70, transistor 50, indicator 38, resistor 52 and capacitor 54.

Indication circuitry 36a provides benefits in numerous applications, such as inventory monitoring as an exemplary application. In particular, assuming there are a plurality of objects 16 which are being monitored, remote communication device 14 containing indication circuitry 36a can be utilized to identify one of more desired specific objects from the remaining objects within inventory.

For example, referring again to FIG. 2, a user can input a desired identifier within tag identifier 26 of forward link wireless signal 22. The identifier can correspond to a desired object 16 associated with the remote communication device 14 identified by tag identifier 26. Tag identifier 26 can identify one or more desired remote communication devices 14 to identify one or more objects 16.

Interrogator 12 communicates the forward link wireless signal 22 having the proper identifier 26 within communication range 11. Remote communication devices 14 within communication range 11 receive the forward link wireless signal 22 including identifier 26. Individual remote communication devices 14 receiving forward link wireless signal 22 process the received forward link wireless signal 22. Individual remote communication devices 14 identified by the tag identifier 26 proceed to process command 27. Other remote communication devices 14 not identified by tag identifier 26 discard the received forward link wireless signal 22.

Command 27 within forward link wireless signal 22 can include a command to write to port 35 of communication circuitry 32. Following processing of command 27, communication circuitry 32 can generate and output a control signal to indication circuitry 36a. Indication circuitry 36a is configured to receive the control signal and to indicate presence of the respective remote communication device 14 responsive to the control signal.

In one configuration, communication circuitry 32 is configured to output a control signal to indication circuitry 36a comprising data 28 of a received forward link wireless signal 22. More specifically, command 27 can specify the writing of data 28 contained within received forward link wireless signal 22 to port 35 of communication circuitry 32. Data 28 can comprise a byte for controlling indication circuitry 36a. For example, data 28 can include hex FF to turn on indicator 38. Thereafter, interrogator 12 can communicate another forward link wireless signal 22 including hex 00 within data 28. Writing of the hex 00 to data port 35 can be utilized to turn off indicator 38. Other data 28 can be supplied within a forward link wireless signal 22. For example, hex AA can be utilized to flash indicator 38.

Data port 35 is coupled with a D-input of latch 70. Communication circuitry 32 is configured to output a timing signal to a clock (CLK) input of latch 70 via clock output 37. Latch 70 is configured to receive the control signal including data 28 from communication circuitry 32. Latch 70 is configured to store data 28 received from communication circuitry 32. Further, latch 70 is configured to selectively assert an output signal via the Q-output responsive to the received control signal in the described embodiment. The Q-output is coupled with gate (G) electrode of transistor 50. The source (S) electrode of transistor 50 is coupled with ground and the drain (D) electrode of transistor 50 is coupled with indicator 38.

Indicator 38 is selectively coupled with latch 70 via transistor 50 and is configured to output a signal to indicate the presence of the respective remote communication device 14 responsive to the control signal (e.g., data 28) received within latch 70 from communication circuitry 32. As described above, indicator 38 is preferably configured to emit a human perceptible signal to indicate the presence of the respective remote communication device 14. In the depicted embodiment, indicator 38 comprises a light emitting device such as a light, emitting diode (LED) configured to visually indicate the presence of the respective remote communication device 14.

In accordance with the presently described embodiment, only the remote communication devices 14 identified by identifier 26 of forward link wireless signal 22 indicate the presence of the respective remote communicate devices 14 using indication circuitry 36a.

Accordingly, such operates to identify desired objects from other objects according to one application.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of tracking inventory, the method comprising:
placing one or more items at a first location, the one or more items having a radio frequency identification (RFID) tag attached thereto;
providing one or more interrogators identifying information associated with the RFID tag;
broadcasting by the one or more interrogators a first message, the first message comprising a tag identifier;
receiving by a plurality of RFID tags the first message;
communicating by a first RFID tag of the plurality of RFID tags a second message, the first RFID tag being identified by the tag identifier, the first RFID tag having a first location;
receiving by the one or more interrogators the second message; and
providing an indication of the first location.

2. The method of claim 1, wherein the indication includes a visual indication of the first location.

3. The method of claim 2, wherein the visual indication includes a light.

4. The method of claim 1, wherein the indication is provided on the RFID tag.

5. The method of claim 1, wherein the communicating includes backscattering the second message.

6. The method of claim 1, further comprising placing said one or more items at a second location.

7. The method of claim 1, wherein said indication is further configured to indicate generation of wireless signals from said radio frequency communications device.

8. The method of claim 1, wherein the indication includes an audible indication.

9. A method of providing an indication for the location of an object within a communication range of a transmitting radio frequency device, the method comprising:
placing said object at a first location, said object comprising a radio frequency communications device;
receiving by the radio frequency communications device a first message comprising an identifier from the transmitting radio frequency device, said transmitting radio frequency device adapted for identifying information associated with the radio frequency communications device;
communicating by the radio frequency communications device a second message, the radio frequency communications device being identified by the identifier; and providing an indication at the first location, said indication be representative of the proximity of the radio frequency communications device to the transmitting radio frequency device.

10. The method of claim 9, wherein the indication includes a visual indication of the first location.

11. The method of claim 10, wherein the visual indication includes a light.

12. The method of claim 11, wherein the indication is provided on the radio frequency communications device.

13. The method of claim 12, wherein the acts of placing, receiving, communicating and providing are performed as part of a testing operation.

14. The method of claim 13, further comprising placing said object at a second location.

15. The method of claim 9, wherein said indication is further configured to indicate generation of wireless signals from said radio frequency communications device.

16. The method of claim 9, wherein the indication includes an audible indication.

17. A method of providing an indication for the location of an object within a communication range of a transmitting radio frequency device, the method comprising:
    transmitting to an object at a first location, said object comprising a radio frequency communications device, a first message comprising an identifier from the transmitting radio frequency device, said transmitting radio frequency device identifying information associated with the radio frequency communications device; and
    receiving from the radio frequency communications device a second message, the radio frequency communications device being identified by the identifier; and
    wherein transmissions from the transmitting radio frequency device elicit an indication from the radio frequency communication device at the first location, said indication be representative of the proximity of the radio frequency communications device to the transmitting radio frequency device.

18. The method of claim 17, wherein the indication includes a visual indication of the first location.

19. The method of claim 18, wherein the visual indication includes a light.

20. A method of providing an indication for the location of an object, said object comprising a radio frequency communications device, within a communication range of a transmitting radio frequency device, the method comprising:
    receiving at a first location a first message comprising an identifier from the transmitting radio frequency device, said transmitting radio frequency device identifying information associated with the radio frequency communications device; and
    transmitting from the radio frequency communications device a second message, the radio frequency communications device being identified by the identifier; and
    providing an indication from the radio frequency communication device at the first location, said indication be representative of the proximity of the radio frequency communications device to the transmitting radio frequency device.

21. A method of tracking inventory, the method comprising:
    placing an item at a first location, the item having a radio frequency-based identification device attached thereto;
    providing one or more transceiver apparatus with identifying information associated with the radio frequency-based identification device;
    broadcasting by the one or more transceiver apparatus a first message, the first message comprising a device identifier;
    receiving the first message at least at said identification device;
    communicating by the identification device a second message, the identification device being identified by the device identifier, the identification device having a first location;
    receiving by at least one of the one or more transceiver apparatus the second message; and
    providing an indication relating to the first location.

\* \* \* \* \*